United States Patent
Wusterbarth et al.

(10) Patent No.: US 11,402,254 B2
(45) Date of Patent: Aug. 2, 2022

(54) ULTRASONIC FLOW METER CALIBRATION SYSTEM AND METHOD

(71) Applicant: Badger Meter, Inc., Milwaukee, WI (US)

(72) Inventors: Michael A. Wusterbarth, Greenfield, WI (US); Paul W. Eserkaln, Oak Creek, WI (US); Robert Herriges, West Allis, WI (US)

(73) Assignee: Badger Meter, Inc., Milwaukee, WI (US)

( * ) Notice: Subject to any disclaimer, the term of this patent is extended or adjusted under 35 U.S.C. 154(b) by 386 days.

(21) Appl. No.: 16/539,802

(22) Filed: Aug. 13, 2019

(65) Prior Publication Data

US 2021/0048329 A1 Feb. 18, 2021

(51) Int. Cl.
*G01F 25/10* (2022.01)
*G01F 1/667* (2022.01)

(52) U.S. Cl.
CPC .............. *G01F 25/10* (2022.01); *G01F 1/667* (2013.01)

(58) Field of Classification Search
CPC ............................. G01F 25/0007; G01F 1/667
USPC ........................................................ 73/1.34
See application file for complete search history.

(56) References Cited

U.S. PATENT DOCUMENTS

| 5,650,571 A | 7/1997 | Freud et al. | |
| 5,748,504 A * | 5/1998 | Fletcher-Haynes | G01F 1/662 |
| | | | 702/100 |
| 2008/0011100 A1 | 1/2008 | Sharp et al. | |
| 2015/0135850 A1 | 5/2015 | Gotou et al. | |
| 2020/0003594 A1 * | 1/2020 | Drachmann | G01F 1/667 |

FOREIGN PATENT DOCUMENTS

EP       0007782 A1    2/1980

* cited by examiner

*Primary Examiner* — Nathaniel T Woodward
(74) *Attorney, Agent, or Firm* — Boyle Fredrickson S.C.

(57) ABSTRACT

An ultrasonic flow meter configured to measure a flow within a conduit configured for autozeroing during active flow operation of the flow meter. The flow meter includes a printed circuit board including circuitry for conducting ultrasonic transit time flow measurements, the printed circuit board including transducer swap relays and first and second transducer cables connecting the first and second transducers, respectively, to the transducer swap relays. The flow meter further includes a programmable processor configured to generate flow measurement data based on an ultrasonic flow meter calibration performed by the ultrasonic flow meter in situ while measuring flow through the conduit. Calibration includes determining a zero offset value, determining a swap offset value by measuring transit time forward and backward between the first and second transducers through the flow in the conduit, activating the transducer swap relays to physically swap the first and second transducers, and measuring transit time forward and backward between the swapped first and second transducers through the flow in the conduit, determining a flow zero value based on the zero offset and swap offset, and generating flow rate data based on the flow in the conduit and the flow zero offset.

20 Claims, 4 Drawing Sheets

ULTRASONIC FLOW METER CALIBRATION SYSTEM AND METHOD

FIELD OF THE INVENTION

This application relates to the field of fluid measurement devices. More specifically, this application relates to an ultrasonic flow meter calibration system and method for determining a zero-offset during active flow.

BACKGROUND

Ultrasonic flow meters utilize transducers to send and receive ultrasonic signals through a flow stream to measure the velocity of flow through a conduit. Where the transducers include an upstream transducer and a downstream transducer, the flow meter is configured to measure a "time-of-flight" of an ultrasonic signal transmitted between the two, spaced apart, transducers. The ultrasonic signal travels from a first transducer, along an ultrasonic signal path through the fluid and/or gas flowing through the conduit, to be received by a second transducer. The elapsed time between when the signal is sent from the first transducer and received by the second transducer is the time-of-flight. The signal may then be sent in a reverse direction to determine a reverse time-of-flight. The time differential between the forward vs. backward "time of flight" is referred to as the ΔT, which can be used to calculate the velocity of the flow through the conduit. The velocity of the flow through the conduit can, in turn, be used to calculate a flow rate and/or flow volume.

However, the "time of flight" forward versus backwards through a conduit may vary for reasons other that a flow through the conduit. No flow meter matches the theory perfectly. For example, the "time of flight" may vary based on transducer alignment, inconsistencies in the conduit, etc. To account for such variance, meters may be set to have a large value for uncertainty or may be calibrated the meter based on the variance. Giving a large uncertainty value may reduce meter accuracy and, as such, is impractical for some application. When calibrating a meter, during manufacturing, ultrasonic flow meters are calibrated to a "factory zero" where the "time of flight" is consistent forward and backwards during zero flow.

To determine the amount of such calibration, ΔT is calculated without any flow through the conduit. The ΔT is used to calibrate the ultrasonic flow meter.

Even following such factory calibration, variances may be reintroduced during the installation where the flow meter will be used. For example, one type of flow meter are clamp on flow meters that may be affected by the alignment of the meter, the section of conduit onto which the meter is clamped, etc. These factors can also drift over time, affecting the flow meter calibration. Accordingly, it is preferred that the flow meter be calibrated during installation and recalibrated as needed to be calibrated to an "in situ zero" where, once again, the "time of flight" is consistent forward and backwards during zero flow.

However, it is often impractical to arrange fix there to be zero flow through the conduit being measured. This is particularly the case where the flow meter is being recalibrated periodically and/or as needed to account for drift. What is needed is a flow meter and, method of recalibrating the flow meter to allow the flow meter to be calibrated to an "in situ zero" without requiring zero flow through the associated conduit.

SUMMARY OF THE INVENTION

The present invention provides an ultrasonic flow meter that includes an ultrasonic flow meter configured to measure a flow within a conduit configured for autozeroing during active flow operation of the flow meter. The flow meter includes a printed circuit board including circuitry for conducting ultrasonic transit time flow measurements, the printed circuit board including transducer swap relays and first and second transducer cables connecting the first and second transducers, respectively, to the transducer swap relays. The flow meter further includes a programmable processor configured to generate flow measurement data based on an ultrasonic flow meter calibration performed by the ultrasonic flow meter in situ while measuring flow through the conduit. Calibration includes determining a zero offset value, determining a swap offset value by measuring transit time forward and backward between the first and second transducers through the flow in the conduit, activating the transducer swap relays to physically swap the first and second transducers, and measuring transit time forward and backward between the swapped first and second transducers through the flow in the conduit, determining a flow zero value based on the zero offset and swap offset, and generating flow rate data based on the flow in the conduit and the flow zero offset.

In one more detailed aspect, determining a swap offset value includes generating a forward average based on a plurality of measurements taken before activating the transducer swap relays and generating a reverse average based on a plurality of measurements taken after activating the transducer swap relays.

In another embodiment of the invention, generating flow rate data includes calculating an average of a standard flow rate based on one or more measurements taken before activating the transducer swap relays and a swapped flow rate based on one or more measurements taken after activating the transducer swap relays.

In, another embodiment of the invention, the processor is configured to initiate ultrasonic flow meter calibration based on a user input or periodically.

In another more detailed aspect, the processor is configured to monitor the flow rate to identify a steady flow rate prior to initiating ultrasonic flow meter calibration.

In another embodiment of the invention, a computer-implemented method for autozeroing an ultrasonic flow meter configured to measure a flow within a conduit using a processor of the flow meter implementing autozeroing instruction stored in non-transient memory. The method includes determining a zero offset value based on measured transit time forward and backward between first and second transducers through a flow in a conduit and determining a swap offset value by measuring transit time forward and backward between first and second transducers through the flow in the conduit, activating transducer swap relays on a printed circuit board of the flow meter that is connected to the first, and second transducers by first and second transducer cables, respectively, to physically swap the first and second transducers, and measuring transit time forward and backward between the swapped first and second transducers through the flow in the conduit. The method further includes determining a flow zero value based on the zero offset and swap offset and generating flow rate data based on the flow in the conduit and the flow zero offset first and second transducers.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

DETAILED DESCRIPTION OF THE INVENTION

Figure 1:
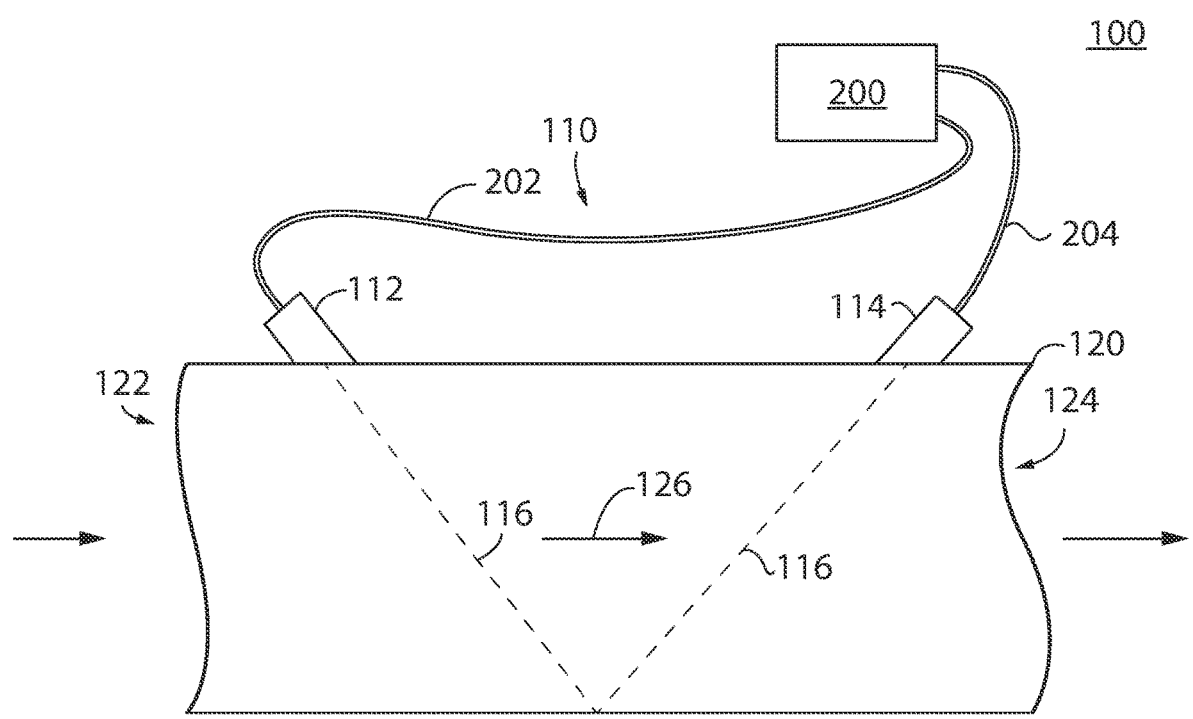
FIG. 1 is a simplified illustration of an ultrasonic flow meter assembly shown in cross section, according to an exemplary embodiment.

Referring first to FIG. 1, a simplified illustration of an ultrasonic flow meter assembly 100 is shown in cross section, according to an exemplary embodiment. The ultrasonic flow meter assembly 100 includes an ultrasonic flow meter 110, a conduit 120, and a flow measurement computer 200. Flow measurement computer 200 is shown and further described below with reference to FIG. 2. Although a specific configuration of an ultrasonic flow meter assembly 100 is shown and described herein, one, of ordinary skill in the art should understand that the invention described herein may be applied to any ultrasonic flow meter assembly configurable to use the signal path definition element described herein.

Ultrasonic flow meter 110 may be a solid state, ultrasonic measurement system configured to measure and report flow of a fluid, or gas through the conduit 120. Ultrasonic flow meter 110 may be configured to be totally encapsulated, weatherproof and UV-resistant within a flow meter housing. Ultrasonic flow meter 110 may be coupled to conduit 120 using clamps, adhesives, etc. In an alternative embodiment, the flow meter housing of ultrasonic flow meter 110 is integrally formed with conduit 120 during manufacturing.

Ultrasonic flow meter 110 includes first and second transducers 112 and 114, respectively, positioned at a known distance apart along conduit 120. Transducers 112 may be piezoelectric transducers, solenoid transducers, etc.

An ultrasound measurement path 116 is depicted to represent an ultrasonic signal path between transducers 112 and 114 through a flow 126 travelling through conduit 120. In the example shown, the measurement path includes a single reflection point between the transducers. However, one of ordinary skill in the art would understand that the measurement path may alternatively configure to include zero or a plurality of reflection points between the transducers 112 and 114. Although only first and second transducers are shown, flow meter 110 may include a plurality of transducers and transducer assemblies in alternative embodiments.

Transducers 112 and 114 may be housed in a housing (not shown). The transducer housing may be the housing for a clamp on ultrasonic flow meter, integrated with conduit 120, etc. The housing may be generally configured to position the transducers such that when the transducers emit ultrasonic signals to travel along the ultrasonic signal path 116, the transmitted signal passing through the flow in conduit 120 and being received by the opposing transducer. Flow meter computer 200 may be housed with the housing or connected to the housing via one or more communication cables.

First transducer 112 is connected to programmable processor 200 by a first transducer cable 202. Second transducer 114 is connected to flow meter circuitry 200 by a second transducer cable 204. Transducer cables 202 and 204 may be any type of cabling configured to facilitate sending and receiving electronic signals between first transducers 112 and 114 and flow meter circuitry 200.

As fluid and/or gas flows into the conduit 120, through an upstream end 122, ultrasonic signals are sent consecutively in forward and reverse directions of flow prior to the fluid or gas exiting the conduit 120 through a downstream end 124. Velocity of the fluid or gas is then determined by measuring the time difference between the measurement in the forward and reverse directions.

Flow meter 110 may further include additional sensors such as a temperature sensor, a pressure sensor, a backflow sensor, etc. Total flow volume may then be calculated from the measured flow velocity using additional information such as temperature, pipe diameter of conduit 120, etc.

The measured and calculated values, including the flow value, may be converted to electrical pulses which are counted as units of consumption of a fluid or gas. These signals may then be transmitted by an internal radio transceiver or through a cable to an external radio transceiver or other system. The radio transceiver typically includes a radio transmitter portion and a radio receiver portion. The radio transmitter portion converts the measurement system signals to a radio frequency signaling protocol for transmission back to a network data collector through a wireless network.

Figure 2:
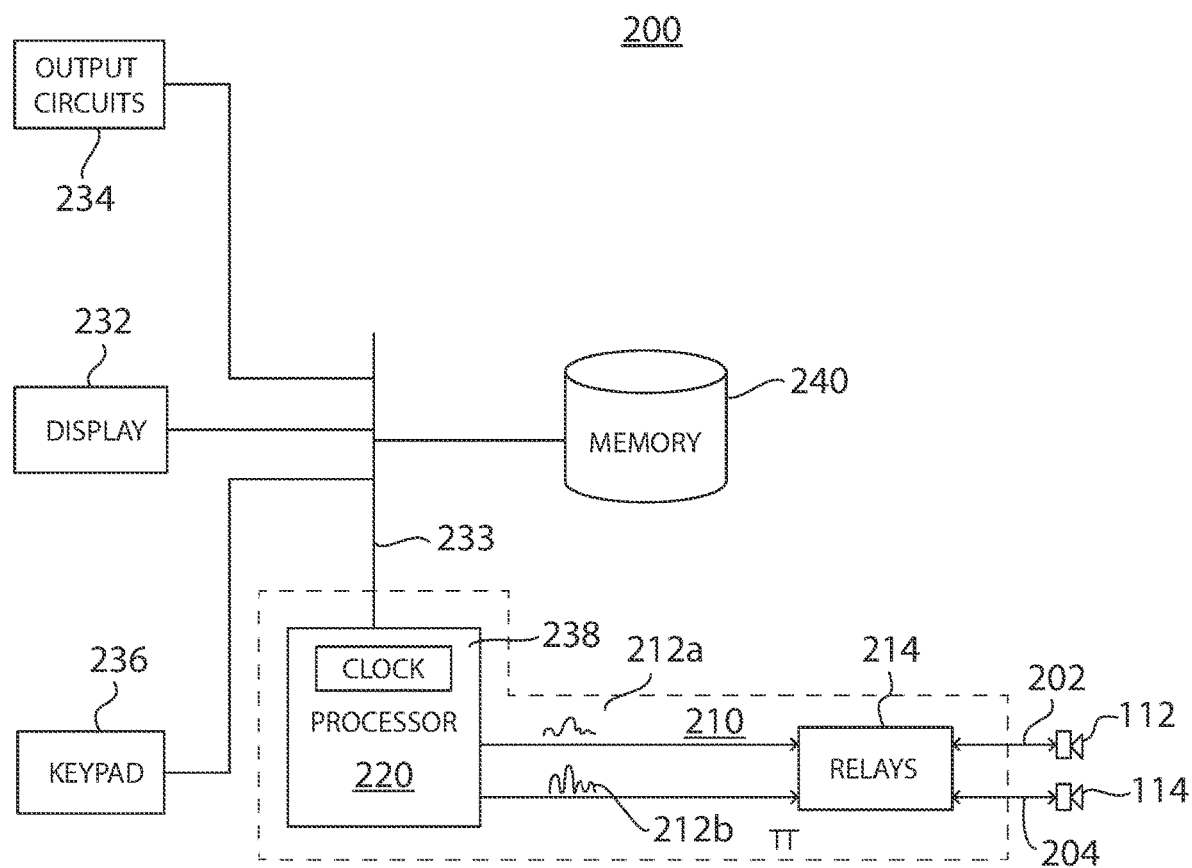
FIG. 2 is flow meter circuitry 200 and components are illustrated in block form, according to an exemplary embodiment.

Referring next to FIG. 2, flow meter computer 200 and components are illustrated in block form, according to an exemplary embodiment. A transit time circuit board 210 includes a programmable processor 220 which also receives the transit time measurements to calculate flow signals for display 232 and for other output circuits 234, and to perform other calculations and analyses of the measurements, as will appear. A keypad 236 provides for user input, to select display parameters, set periodic auto zeroing, etc. for example. A memory 240 is any type of non-transient memory configured to store data. The components of computer 200 may be interconnect for communication through a communication bus 233. One of ordinary skill in the art should understand that the components described herein are exemplary and different components or a different arrangement of components may be used to achieve the functionality described herein.

The transit time circuit board 210 is a printed circuit board (PCB) and comprises the programmable processor 220 and transducer swap relays 214. Programmable processor 220 conducts transit time flow measurements for calculation of the flow measurements. Programmable processor 220 is connected through transducer swap relays 214 with transducers 112, 114.

Relays 214 are used to physically swap the connections between programmable processor 220 and transducers 112 and 114. Relays 214 may be implemented using electromechanical relays, solid state relays, etc. Although relays 214 are described herein as a plurality of relays, relays 214 may be implemented using a single relay to perform the functionality described herein. Programmable processor 220 controls the operation of relays 214 to switch between operating states as described below.

Accordingly, the physical connection of transducers 112 and 114 with programmable processor 220 is controlled by the operation of relays 214. In an unswapped operating state, transducer 112 is connected to a first transducer connection (not shown) of the programmable processor 220 and transducer 114 is connected to a second transducer connection (not shown) of the programmable processor 220. In a swapped operating state, transducer 114 is connected to a first transducer connection of programmable processor 220 and transducer 112 is connected to a second transducer connection of programmable processor 220. Programmable processor 220 may be used to control the operation of transducers 112 and 114 as either transmitting or receiving receivers independent of the operating state of relays 214.

Where relays 214 are in a first operating state, an unswapped operating state in this example, programmable processor 220 measures unswapped transit times. Specifically, a transit time measurement is initiated by a wave 212a from programmable processor 220 which is connected with the transmitting transducer, shown as transducer 112 in FIG. 2 based on an operating state of relays 214. The pulse 212a may be a modulated sign wave, a square wave, etc. that excites a piezo transducer in, the transmitting transducer to generate a sinusoidal burst. The received signal 212b is produced by the receiving transducer, shown as transducer 114 in FIG. 2 based on the operating state of relays 214, to an input of programmable processor 220. After several pulses are transmitted downstream from transducer 112 to transducer 114, a like number of pulses are transmitted upstream from transducer 114 to transducer 112 without changing the operating state of the relays 214. Programmable processor 220 measures the upstream and downstream unswapped travel times and provides this information to processor 220. The processor 220 utilizes these unswapped travel times to calculate an unswapped $\Delta T$.

Following the calculation of a $\Delta T$ in the first operating state, relays 214 may be actuated to swap to the second operating state, a swapped operating state in the example, and programmable processor 220 measures swapped transit times. Similar to above, a transit time measurement is initiated by a pulse 212a from programmable processor 220 which is connected with the transmitting transducer, transducer 114 based on the swapped operating state of relays 214. The wave 212a excites a piezo transducer in the transmitting transducer to generate a sinusoidal burst. The received signal 212b is produced by the receiving transducer, transducer 112 based on the swapped operating state of relays 214, to an input of programmable processor 220. After several pulses are transmitted downstream from transducer 114 to transducer 112, a like number of pulses are transmitted upstream from transducer 112 to transducer 114. Programmable processor 220 measures the upstream and downstream swapped travel times. The processor 220 utilizes these swapped travel times to calculate a swapped $\Delta T$.

Clock 238 provides time signals to processor 220. Outputs from programmable processor 220 are provided to display 232 showing flow rate and total flow, and/or to other output circuits 234 which might include a transmitter to a remote display, a recorder, or the like. Keypad 236 may be used to select display parameters, as milliliters per minute or gallons per hour, for example.

Advantageously, physically swapping transducers 112 and 114 allows calibration of ultrasonic flow meter 110 to account for variances introduces by the installation, composition and operation of transducer 112 and 114 as well as transducer cables 202 and 204. For example, if the zero point of the transducer has drifted from its set value in normal operation then the physical swapping of the transducers will account for some of the new offset.

Figure 3:
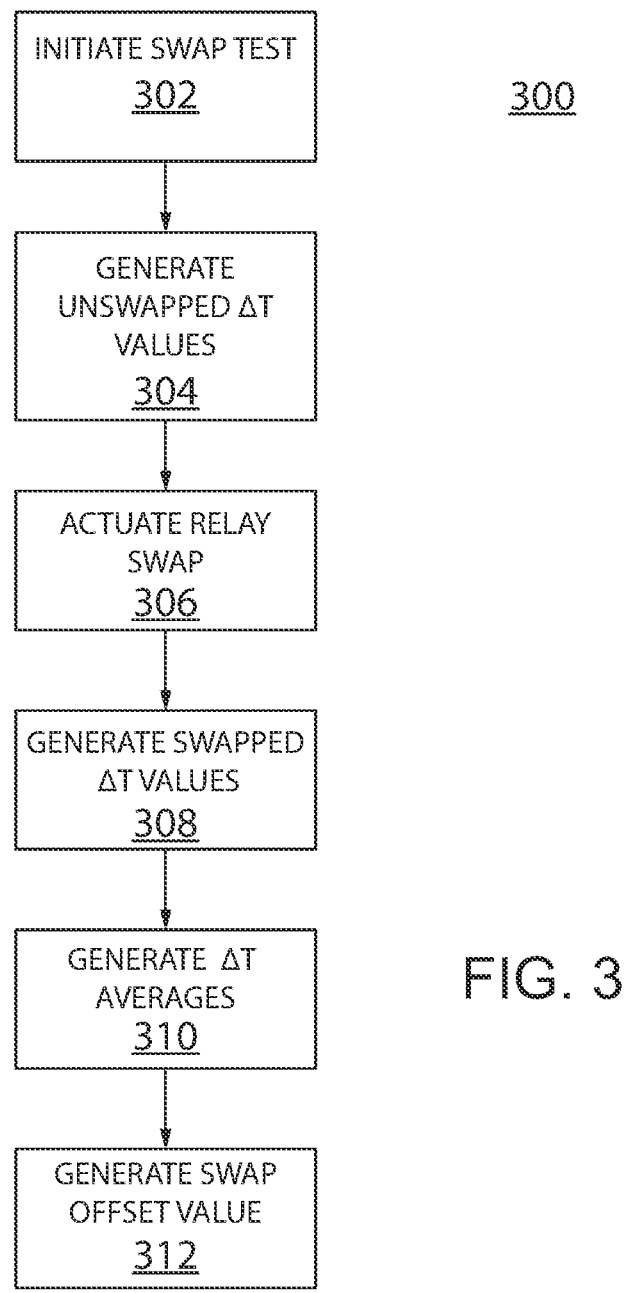
FIG. 3 is a flowchart illustrating a swap offset determination method for initiating and maintaining calibration of an ultrasonic flow meter using relay swapped transducers, according to an exemplary embodiment.

Referring now additionally to FIG. 3, a flowchart 300 illustrating a swap offset determination method for initiating and maintaining calibration of an ultrasonic flow meter using relay swapped transducers is shown, according to an exemplary embodiment. The method includes determining both a zero offset and a swap offset to allow for "in situ" calibration without requiring zero flow through the conduit.

In a step 302, a swap test is initiated for setting a swap offset value. Although the swap test is used to allow auto zeroing without requiring zero flow to the conduit 120, the swap test may be performed independent of whether or not a flow is being conducted through the conduit 120. Specifically, a swap test may be performed while there is zero flow through conduit 120 during manufacture of the ultrasonic flow meter and used in combination with a traditional zero offset to generate a factory zero value that are all stored in the memory of the newly manufactured ultrasonic flow meter. Ultrasonic flow meter 110 may be configured to retain these values in memory as default values throughout the life of the ultrasonic flow meter.

In a step 304, ultrasonic flow meter 110 is configured to determine a set number of $\Delta T$ values in rapid succession. The set number of values may be any number but will be described herein as being ten (10) $\Delta T$ values. In typical operation, ultrasonic flow meter 110 is able to generate the ten (10) $\Delta T$ values in approximately one (1) second of operation. These are full $\Delta T$ measurements, including both upstream and downstream time-of-flight for each point.

The ten (10) $\Delta T$ values generated in step 304 are generated, while the operating state of relays 214 is in an unswapped operating state. Accordingly, the ten (10) $\Delta T$ values are unswapped $\Delta T$ values.

In a step 306, ultrasonic flow meter 110, specifically program the processor 200 is configured to actuate relays 214 to change the operating state of relays 214 from an unswapped operating state to a swapped operating state. In the swapped operating state, transducers 112 and 114 are physically swapped relative to the operation of the programmable processor 220.

In a step 308, ultrasonic flow meter 110 is configured to again determine ten (10) $\Delta T$ values in rapid succession. The ten (10) $\Delta T$ values are generated while the operating state of relay 214 is in the swapped operating state. Accordingly, the ten (10) $\Delta T$ values are swapped $\Delta T$ values.

In a step 310, programmable processor 220 is configured to generate both swapped and unswapped $\Delta T$ values based on the equations:

$$\overline{\Delta T_1} = \frac{1}{n}\sum_{i=1}^{n} \Delta T_{1i}$$

$$\overline{\Delta T_2} = \frac{1}{n}\sum_{i=1}^{n} \Delta T_{2i}$$

where $\Delta T_1$ are the unswapped $\Delta T$ values and $\Delta T_2$ are the swapped $\Delta T$ values.

In addition to the averaging described above, each ten (10) $\Delta T$ values may be used to generate a standard deviation for each grouping of ten. The standard deviation may be used to eliminate any outlying data points in the groupings.

The step 312, programmable processor 220 is configured to generate a swap offset value based on the equation:

$$\varepsilon_{swap} = \frac{\overline{\Delta T_1} - (-\overline{\Delta T_2})}{2}$$

where ε is an offset value.

Figure 4:
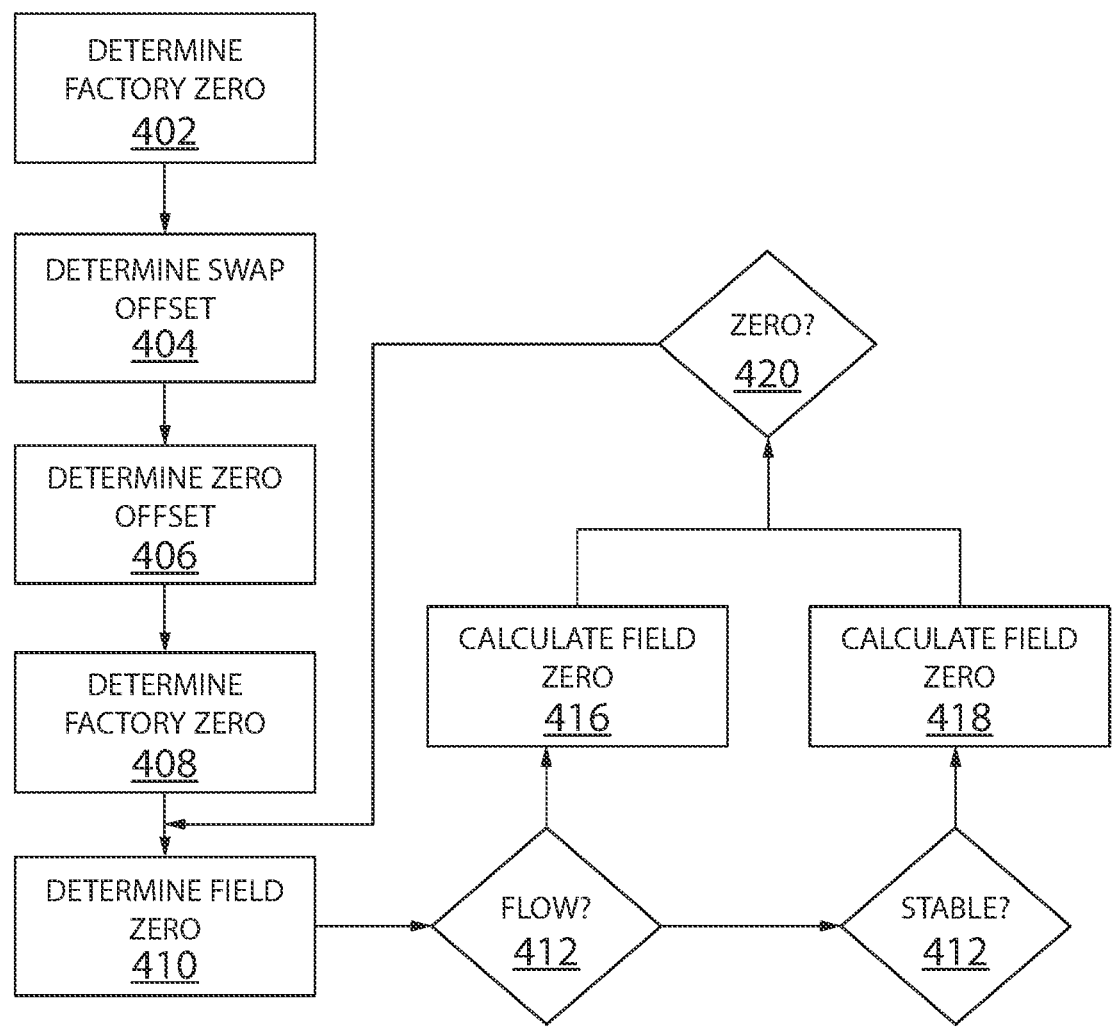
FIG. 4 is a flowchart illustrating a method for auto zeroing ultrasonic flow meter without requiring zero flow, according to an exemplary embodiment.

Referring now additionally to FIG. 4, a flowchart 400 illustrating a method for auto zeroing ultrasonic flow meter 110 without requiring zero flow is shown, according to an exemplary embodiment. The method may be implemented using programmable processor 220 in cooperation with programmable processor 220 to zero the flow meter 110 initially, following installation, and during operation as needed.

In step 402, processor 220 is configured to initiate a zero calculation for ultrasonic flow meter 110 while the ultrasonic flow meter 110 is being used with zero flow through conduit 120. Step 402 will typically be performed during manufacture and initial testing of the ultrasonic flow meter 110.

In a step 404, a swap offset is determined using the method this described above with reference to FIG. 3.

In step 406, processor 220 is configured to determine a zero offset value(εzero) based on the equations:

$$\text{Zero} = \Delta T_1$$

$$\varepsilon_{zero} = \text{Zero} - \varepsilon_{swap}$$

where ΔT is the standard zero value that requires zero flow.

In step 408, processor 220 is configured to use the swap offset value from step 404 in combination with the zero offset value calculated in step 406 to determine a factory zero for the ultrasonic flow meter 110 that was generated while zero flow was being conducted through conduit 120. The factory zero is the zero offset minus the swap offset. Processor 220 is then, configured to store the zero offset, the swap offset and the factory zero in memory 240 of ultrasonic flow meter 110 to be used as default values.

In a step 410, ultrasonic flow meter 110 is installed "in situ" and recalibrated following its installation. For example, where ultrasonic flow meter 110 is a clamp on flow meter, installation may include clamping the flow meter 110 to a conduit 120. It is desirable to again recalibrate and auto zero flow meter 110 to account for any variance introduced during transport and installation.

In a step 412, flow meter 110 may be configured to determine whether there is a flow within conduit 120. Where a flow is detected, in a step 414 flow meter 110 may determine whether the flow through conduit 120 is a stable flow that is relatively free from vortices, eddies, particulates, etc. Where the flow is unstable, ultrasonic flow meter 110 may iteratively perform a wait operation until a stable flow is detected.

Where a stable flow is detected, in the step 116, flow meter 110 is configured to determine a flowing zero value based on the equations:

$$\Delta T_{corrected} = \Delta T_{measured} - \varepsilon_{total}$$

$$\varepsilon_{total} = \varepsilon_{swap_{recent}} + \varepsilon_{zero}$$

Where no flow is detected in step 412, zeroing may be performed using the steps described, in step 404 through 408 above to determine the field zero in a step 418. Following determination of the field zero in step 416, flow meter 110 may be configured to utilize the field zero for calibration and performing flow measurements. However, flow meter 110 is configured to retain the factory zero settings stored in memory 240.

In a step 420, flow meter 110 is configured to zero during normal operation of the flow meter 110 while metering the flow through conduit 120. Auto zeroing may be performed based on user input received at keypad 236, periodically, and/or based on a detected need for zeroing. Periodic zeroing may be performed based on a period time set by a user, again using keypad 236.

Advantageously, configuring flow meter 110 to perform auto zero operations while there is flow within conduit 120 enables periodic auto zeroing. Periodic auto zeroing is beneficial to account for zero-drift that may occur in ultrasonic flow meters 100.

The detected need for auto zeroing may include detection of bad metering data generated by a flow meter 110. Detecting bad metering data may include recalibrating flow meter 110 based on the factory zero settings generated as described in FIG. 3 and thereafter performing autozeroing as described in FIG. 4.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

We claim:

1. An ultrasonic flow meter configured to measure a flow within a conduit, comprising:
   first and second transducers;
   a printed circuit board including circuitry for conducting ultrasonic transit time flow measurements, the printed circuit board including a transducer swap relays; and
   first and second transducer cables connecting the first and second transducers, respectively, to the transducer swap relay;
   a programmable processor included on the printed circuit board that is configured to generate flow measurement data based on an ultrasonic flow meter calibration performed by the ultrasonic flow meter in situ while measuring flow through the conduit, the calibration including the steps of:
   determining a zero offset value,
   determining a swap offset value by measuring transit time difference (ΔT) forward and backward between the first and second transducers through the flow in the conduit, activating the transducer swap relays to physically swap the first and second transducers, and measuring transit time difference forward and backward between the swapped first and second transducers through the flow in the conduit,
   determining a flow zero value based on the zero offset and swap offset, and
   generating flow rate data based on the flow in the conduit and the flow zero offset.

2. The flow meter of claim 1, wherein determining a swap offset value includes generating a forward average based on a plurality of measurements taken before activating the transducer swap relays and generating a reverse average based on a plurality of measurements taken after activating the transducer swap relays.

3. The flow meter of claim 1, wherein the transducer swap relays are electromechanical relays.

4. The flow meter of claim 1, wherein generating flow rate data includes calculating an average of a standard flow rate based on one or more measurements taken before activating the transducer swap relays and a swapped flow rate based on one or more measurements taken after activating the transducer swap relays.

5. The flow meter of claim 1, wherein the processor is configured to initiate ultrasonic flow meter calibration based on a user input.

6. The flow meter of claim 1, wherein the processor is configured to initiate ultrasonic flow meter calibration periodically.

7. The flow meter of claim 1, wherein the processor is configured to monitor the flow rate to identify a steady flow rate prior to initiating ultrasonic flow meter calibration.

8. A computer-implemented method for zeroing an ultrasonic flow meter configured to measure a flow within a conduit using a programmable processor of the flow meter implementing zeroing instructions stored in non-transient memory, the steps comprising:
- determining a zero offset value based on measured transit time forward and backward between first and second transducers through a flow in a conduit;
- determining a swap offset value by
  - measuring transit time forward and backward between first and second transducers through the flow in the conduit,
  - activating a transducer swap relays on a printed circuit hoard of the flow meter that is connected to the first and second transducers by first and second transducer cables, respectively, to physically swap the first and second transducers, and
  - measuring transit time forward and backward between the swapped first and second transducers through the flow in the conduit;
- determining a flow zero value based on the zero offset and swap offset; and
- generating flow rate data based on the flow in the conduit and the flow zero offset.

9. The method of claim 8, wherein determining a swap offset value includes generating a forward average based on a plurality of measurements taken before activating the transducer swap relays and generating a reverse average based on a plurality of measurements taken after activating the transducer swap relays.

10. The method of claim 8, wherein the transducer swap relays are electromechanical relay.

11. The method of claim 8, wherein generating flow rate data includes calculating an average of a standard flow rate based on one or more measurements taken before activating the transducer swap relays and a swapped flow rate based on one or more measurements taken after activating the transducer swap relays.

12. The method of claim 8, wherein the processor is configured to initiate ultrasonic flow meter calibration based on a user input.

13. The method of claim 8, wherein the processor is configured to initiate ultrasonic flow meter calibration periodically.

14. The method of claim 8, wherein the processor is configured to monitor the flow rate to identify a steady flow rate prior to initiating ultrasonic flow meter calibration.

15. An ultrasonic flow meter configured to measure a flow within a conduit, comprising:
- first and second transducers;
- a printed circuit board including circuitry for conducting ultrasonic transit time flow measurements, the printed circuit board including transducer swap relays; and
- first and second transducer cables connecting the first and second transducers, respectively, to the transducer swap relay;
- a programmable processor included on the printed circuit board that is configured to generate flow measurement data based on an ultrasonic flow meter calibration performed by the ultrasonic flow meter, the calibration including the steps of:
  - determining a zero offset value,
  - determining a swap offset value by measuring transit time forward and backward between the first and second transducers through the flow in the conduit, activating the transducer swap relays to physically swap the first and second transducers, and measuring transit time forward and backward between the swapped first and second transducers through the flow in the conduit,
  - determining a flow zero value based on the zero offset and swap offset.

16. The flow meter of claim 15, wherein determining a swap offset value includes generating a forward average based on a plurality of measurements taken before activating the transducer swap relays and generating a reverse average based on a plurality of measurements taken after activating the transducer swap relays.

17. The flow meter of claim 15, wherein the transducer swap relays are electromechanical relay.

18. The flow meter of claim 15, wherein generating flow rate data includes calculating an average $\Delta T$ to produce a flow rate based on one or more measurements taken before activating the transducer swap relays and a swapped flow rate based on one or more measurements taken after activating the transducer swap relays.

19. The flow meter of claim 15, wherein the processor is configured to initiate, ultrasonic flow meter calibration based on a user input.

20. The flow meter of claim 15, wherein the processor is configured to monitor the flow rate to identify a steady flow rate prior to initiating ultrasonic flow meter calibration.

* * * * *